United States Patent [19]

Moore

[11] Patent Number: 4,984,722
[45] Date of Patent: Jan. 15, 1991

[54] ADJUSTABLE CUP HOLDER

[76] Inventor: Steven W. Moore, 5926-145th St. S.W., Edmonds, Wash. 98020

[21] Appl. No.: 514,101

[22] Filed: Apr. 25, 1990

[51] Int. Cl.$^5$ .......................... B60R 7/00; A47K 1/08
[52] U.S. Cl. ............................. 224/42.43; 248/311.2; 224/42.45 R
[58] Field of Search .......... 224/42.43, 42.42, 42.45 R; 248/311.2, 278, 231.1, 214, 215; 220/85 H, 8

[56] References Cited

U.S. PATENT DOCUMENTS

| | | | |
|---|---|---|---|
| 4,887,784 | 12/1989 | Kayali | 248/311.2 |
| 4,943,111 | 7/1990 | Vander Laan | 297/194 |

Primary Examiner—Henry J. Recla
Assistant Examiner—David J. Walczak
Attorney, Agent, or Firm—David L. Tingey

[57] ABSTRACT

An cup holder for a variety of beverage containers adjustable to accommodate a wide range of container sizes and types. The holder comprises a back plate 10, an upper bracket 30, a lower cover plate 40, and an adjustable door-mounting bracket 20. The upper bracket 30 comprises a pair of extendable opposing arms 31 and 32 extending horizontally from the upper bracket 30 at an angle less than perpendicular, defining an adjustable space between them for insertion of a beverage container. A snack attachment mechanism 37 is provided on one or both arms. The upper bracket 30 with extendable arms 31 and 32 is folded downward against the back plate 10 when not in use. The lower cover plate 40 extends horizontally and serves as a platform on which a beverage container may rest, folding upward over the upper bracket and against the holder back plate 10 when not in use, presenting when closed a covered and protected beverage holder. The door-mounting bracket 20 is adjustable with overlapping plates, one sliding into side grooves of the other, with a set of matching grooves 27 and extruding serrations 28 on facing surfaces to prevent unwanted sliding.

5 Claims, 4 Drawing Sheets

ADJUSTABLE CUP HOLDER

BACKGROUND OF THE INVENTION

The present invention relates to cup holders, and more specifically, for cup holders that are collapsible for storage, adaptable for use with a wide range of cup sizes, and safe and convenient for use in automobiles.

It is known in the art to have cup holders adaptable for use with various cup sizes. For example, Harper, U.S. Pat. No. 4,749,112 teaches a holder for beverage containers having resiliently deformable arms that enlarge the defined container space between the arms to accommodate large containers. Harper also teaches a means for mounting the holder to an automobile which comprises a rigid horizontal tongue having a downwardly vertical extension defining a channel between the extension and the holder body; the tongue with extension is typically inserted over an automobile inner door and into its window slot to secure the holder to the door. The tongue may be attached to the holder body with one of several means including a ratchetand-pawl connection. Canadian patent no. 792,124 teaches a collapsible cup holding bracket in which a spring-loaded supporting ring and a bottom support plate unfold 90 degrees from their storage positions to form a receptacle for beverage containers.

It is the object of this invention to provide a collapsible holder for a beverage container with rigid arms for strength and reliability yet is adjustable to hold a wide range of container sizes.

It is the further object of this invention that, consistent with the above requirement, the required holder be collapsible into a convenient storage configuration.

It is the further object of this invention, consistent with the above requirements, that the required holder be conveniently and removably attachable to an automobile inner door by inserting a flange through the door window slot, yet adjustable in size to accommodate inner doors of various thickness while providing a secure mount to the door.

It is the further object of this invention, consistent with the above requirements, that the required holder provide a convenient mechanism for removable attachment of snack containers to the holder.

SUMMARY OF THE INVENTION

The present invention provides a holder for a variety of beverage containers adjustable to accommodate a wide range of container sizes and types. The holder comprises a back plate, an upper bracket, a lower cover plate, and an adjustable door-mounting bracket. The upper bracket further comprises a pair of extendable opposing arms inserted in the upper bracket and extending horizontally from the back plate at an angle less than perpendicular, defining an adjustable space between them for insertion of a beverage container. A snack attachment mechanism is provided on one or both arms. The upper bracket with extendable arms may be folded downward against the back plate when not in use. The lower cover plate extends horizontally and serves as a platform on which a beverage container may rest, folding upward over the upper bracket and against the holder back plate when not in use, presenting when closed a covered and protected beverage holder. The door-mounting bracket 20 is adjustable with overlapping plates, one sliding into side grooves of the other, with a set of matching grooves 27 and extruding serrations 28 on facing surfaces to prevent unwanted sliding.

DESCRIPTION OF THE PREFERRED EMBODIMENTS

Referring to the figures, in its usual configuration the present invention principally comprises a holder back plate 10, a door-mounting bracket 20, an upper bracket 30, and a lower cover plate 40. The holder back plate 10 also has means for removably mounting the door-mounting bracket 20 to the holder back plate 10. It also has means for pivotably mounting the upper bracket 30 and the lower cover plate 40 to the holder back plate 10 with additional means for retaining these in storage position vertically against the back plate or in operational position horizontally extended from the back plate.

Figure 1:
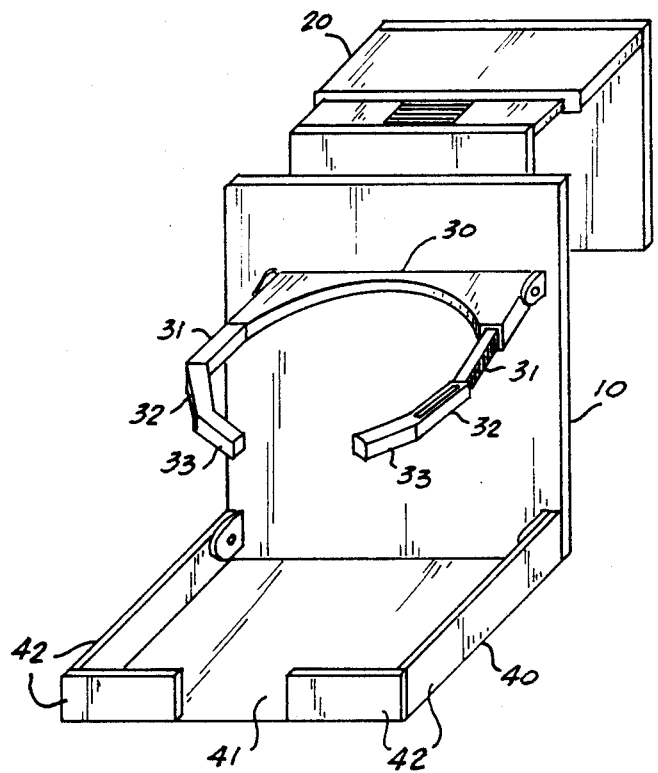
FIG. 1 is a front perspective view of the adjustable cup holder in opened operational position.
Figure 2:
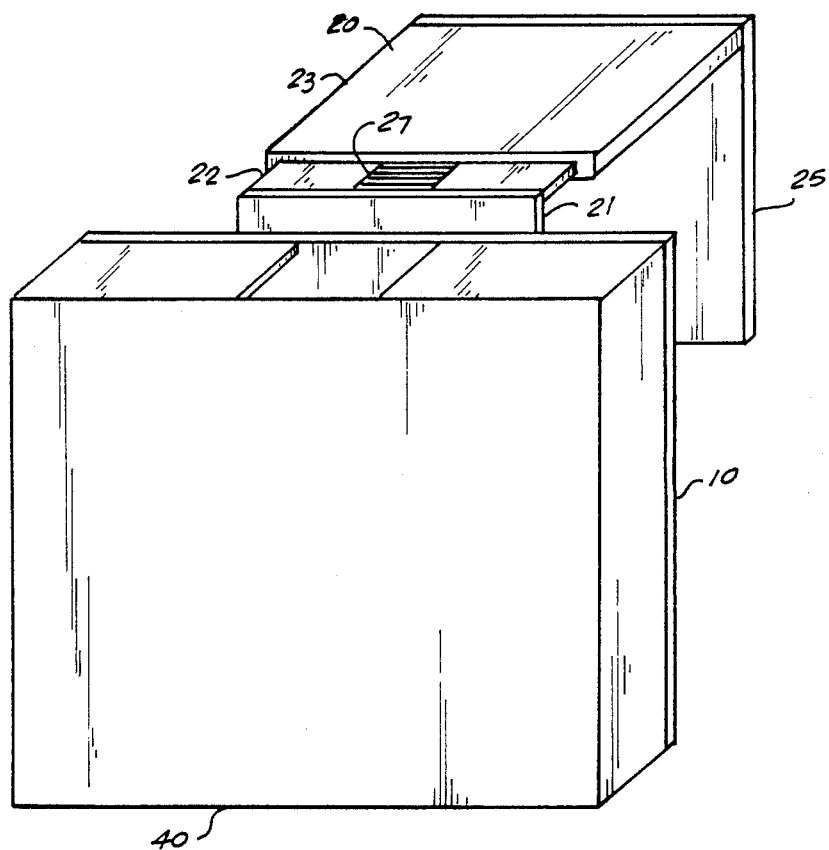
FIG. 2 is a front perspective view of the adjustable cup holder in closed storage position.
Figure 3:
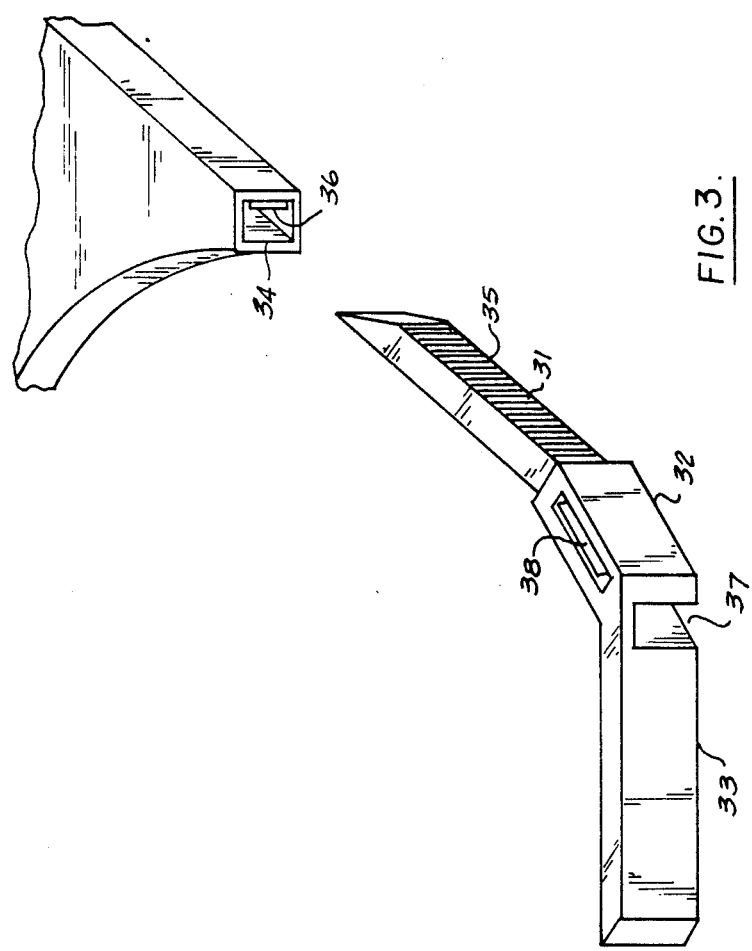
FIG. 3 is a perspective view of the adjustable arm showing a plurality of arm lengths, a slot for attachment of snacks, and an upper bracket aperture into which the arm is positioned, also showing an extrusion in the aperture and parallel grooves of the arm first length.
Figure 4:
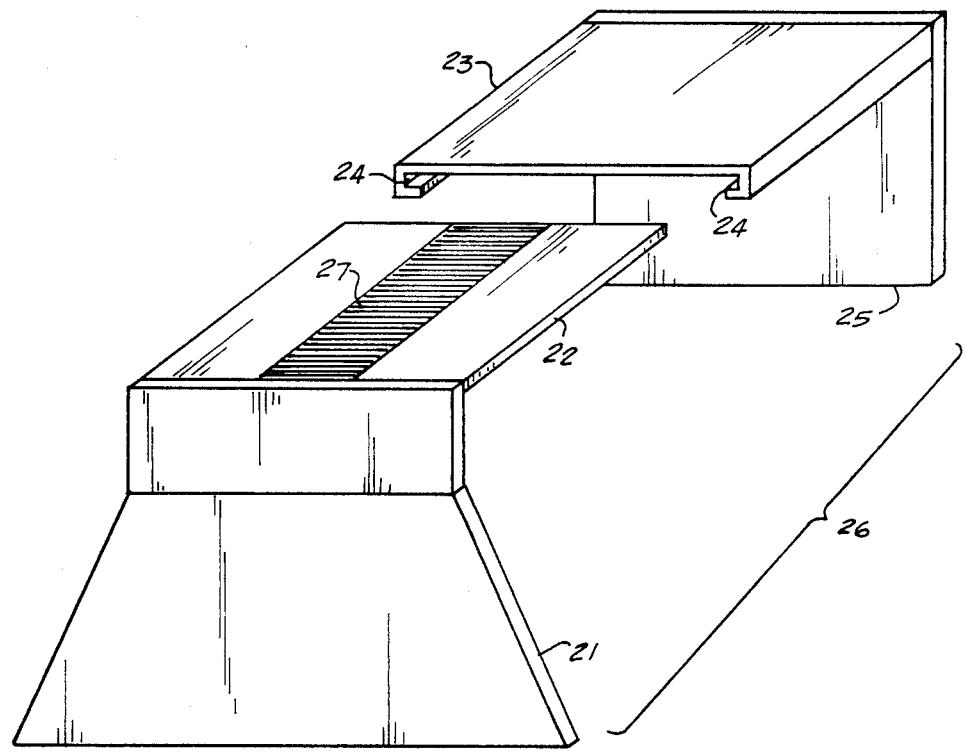
FIG. 4 is a perspective view of the door-mounting bracket showing a vertical mounting plate, a horizontal mounting plate attached near the top of the vertical mounting plate, a channelled horizontal plate with undersurface side grooves, and a window plate attached to the end of the channelled horizontal plate.
Figure 5:
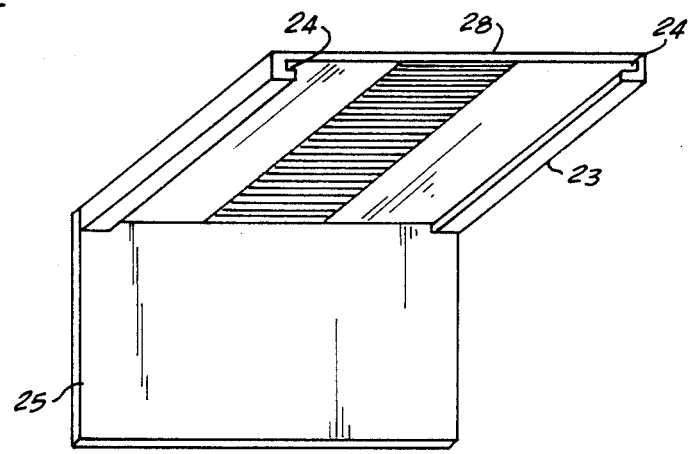
FIG. 5 is a perspective view from the underside of a channelled horizontal plate showing undersurface side grooves and an area of extruding serrations.

The upper bracket 30 as shown in FIG. 1 comprises a pair of opposing arms having a plurality of connected lengths 31, 32, 33 which extend from the upper bracket horizontally, each pair of adjacent lengths forming an obtuse angle between them. The plurality of lengths cumulatively approximate an arc each directed, respectively, toward its opposing arm which also presents an approximate arc in a similar manner. A first length 31 of each opposing arm is inserted slidably into a fitted upper bracket aperture 34 forming an angle less than perpendicular with the holder back plate. Each arm also has a series of regular, parallel grooves 35 along its first length 31 which, when the arm is inserted into the aperture, acts in combination with an extrusion 36 in the upper bracket aperture, the extrusion 36 extending into a selected one of the parallel grooves 35 at a desired arm extension position. The extrusion 36 is mounted on and normal to the front end of a tension brace inserted and secured into a slot in the back plate side of the upper bracket. The tension brace provides a spring action in the extrusion which maintains it in position against the grooves of the arm.

On one or more of the arm lengths is provided a slot 37 opening downward for removable attachment of a snack container, such as a small bag. In the slot 37 is a protruding plate or hook 38 extending nominally upward across the slot 37 from near the bottom of a first slot wall and terminating unconnected at or near an opposite slot wall, characteristically leaning on the opposite slot wall under tension. A snack container is typically inserted from the bottom of the slot and retained in position in the slot by the plate or hook. The snack container is removed by sliding it out the side of the slot.

The door-mounting bracket 20 comprises a vertical mounting plate 21 with means for securing to it the holder back plate 10, a horizontal mounting plate 22 attached near the top of the vertical mounting plate 21, a channelled horizontal plate 23 with undersurface side grooves 24 into which the horizontal mounting plate 22 slides, a window plate 25 attached to the end of the channelled horizontal plate 23 at an angle nominally vertical but in fact less than perpendicular such that the plane of the window plate 25 and that of the channelled horizontal plate 23 form an acute angle, the window plate 25, the vertical mounting plate 21, and the combination of horizontal mounting plate 22 and channelled horizontal mounting plate 23 defining between them a door channel 26 which mounts over an automobile inner door with the window plate 25 inserted into a door window slot. The window plate 25 mounted with a lean back toward the vertical mounting plate 21 enables the door-mounting bracket 20 to mount to an inner door under tension to assures a secure fit and mount of the holder invention to the door.

On the upper surface of the horizontal mounting plate 22 extending from the vertical mounting plate to its end is an area of closely-spaced grooves 27 nominally transverse to the length of the horizontal mounting plate 22. On the lower surface of the channelled horizontal plate 23 from its end to the window plate 25 is an area of serrations 28 extruding with a frequency and over an area which matches the grooves of the vertical mounting plate such that when mounted together the extruding serrations 28 penetrate the grooves 27 to prevent unwanted sliding, yet providing an installer to adjust the width of the door channel 26 to match an inner door width of an automobile.

The lower cover plate 40 comprises a bottom plate 41 with cover plate walls 42 mounted on its sides with dimension sufficient such that when it is folded into storage position over the stored upper bracket 30 the cover plate 41 encloses and protects the invention holder except the door-mounting bracket.

Having described the invention, what is claimed is:

1. A cup holder comprising a holder back plate onto which is removably attached a door-mounting bracket means useful for automobile doors, an upper bracket, and a lower cover plate, the upper bracket and the lower cover plate extending horizontally from the holder back plate when in use, with means for mounting the holder back plate to the doormounting bracket and for pivotably mounting the upper bracket and the lower cover plate to the holder back plate, the improvement therein comprising in the upper bracket, a pair of opposing arms comprised of a plurality of connected lengths and extending from the upper bracket horizontally, each pair of adjacent lengths forming an obtuse angle between them, the plurality of lengths cumulatively approximating an arc each directed, respectively, toward its opposing are which also presents an approximate arc in a similar manner said upper bracket having a pair of apertures extending outwardly with respect to each other and at an angle less than perpendicular with respect to said back plate, a first length of each opposing arm slidably inserted into said fitted upper bracket apertures, respectively, each arm also having a series of regular, parallel grooves along its first length which, when the arm is inserted into the aperture, act in combination with an extrusion in the upper bracket aperture, the extrusion extending into a selected groove at a desired arm extension position.

2. A holder as in claim 1, in which the lower cover plate comprises a bottom plate with cover plate walls mounted to its sides with dimension such that when it is folded into storage position over a stored upper bracket the lower cover plate encloses and protects the holder except the doormounting bracket.

3. A holder as in claim 1 in which the door-mounting bracket comprises a vertical mounting plate with means for securing it to the holder back plate, a horizontal mounting plate attached near the top of the vertical mounting plate, a channelled horizontal plate with undersurface side grooves into which the horizontal mounting plate slides forming an extendable horizontal mounting member, a window plate attached to the end of the channelled horizontal plate, the vertical mounting plate, the window plate and the horizontal mounting member defining a door channel for mounting over an automobile inner door with the window plate inserting into a automobile door window slot, the improvement therein comprising on the upper surface of the horizontal mounting plate, an area of grooves nominally transverse to the length of the horizontal mounting plate;

on the lower surface of the channelled horizontal plate, an area of extruding serrations which matches the grooves of the vertical mounting plate such that when the two plates are mounted together the extruding serrations extend into the grooves to prevent unwanted sliding, yet allow an installer to adjust the width of the door channel.

4. A holder as in claim 1 in which the door-mounting bracket comprises a vertical mounting plate with means for securing it to the holder back plate, a horizontal mounting plate attached near the top of the vertical mounting plate, a channelled horizontal plate with undersurface side grooves into which the horizontal mounting plate slides forming an extendable horizontal mounting member, a window plate attached to the end of the channelled horizontal plate, the vertical mounting plate, the window plate and the horizontal mounting member defining a door channel for mounting over an automobile inner door with the window plate inserting into a automobile door window slot, the improvement therein comprising attachment of the window plate to the channelled horizontal plate such that their planes form an acute angle, the door-mounting bracket thereby mounting to an automobile inner door under tension.

5. A claim as in claim 1 in which is provided on one or more of the arm lengths for removable attachment of a snack container, a slot opening downward and having a protruding plate extending nominally upward across the slot from near the bottom of a first slot wall and terminating unconnected at or near an opposite slot wall.

* * * * *